United States Patent [19]

Eilers et al.

[11] Patent Number: 5,286,455
[45] Date of Patent: Feb. 15, 1994

[54] PROCESS FOR THE PREPARATION OF HYDROCARBONS

[75] Inventors: Jacobus Eilers, Amsterdam; Sytze A. Posthuma; Pieter J. Hoek, both of The Hague, all of Netherlands

[73] Assignee: Shell Oil Company, Houston, Tex.

[21] Appl. No.: 995,120

[22] Filed: Dec. 22, 1992

Related U.S. Application Data

[63] Continuation of Ser. No. 710,991, Jun. 6, 1991, abandoned.

[30] Foreign Application Priority Data

Jun. 18, 1990 [GB] United Kingdom ............... 9014417

[51] Int. Cl.$^5$ ........................ G05D 7/00; B01S 8/06
[52] U.S. Cl. .................................... 422/110; 165/139; 422/193; 422/196; 422/197; 422/201
[58] Field of Search .................. 422/110–112, 422/198–200, 188, 202, 190, 193, 196, 197, 211, 220, 148; 165/139

[56] References Cited

U.S. PATENT DOCUMENTS 4,285,910 8/1981 Kennedy, Jr. .................. 422/219
4,683,121 7/1987 Goudriaan et al. ............. 422/197
4,751,057 6/1988 Westerman ..................... 422/197

FOREIGN PATENT DOCUMENTS 2169309A 7/1986 United Kingdom .
2204055A 11/1988 United Kingdom .
2223237A 4/1990 United Kingdom .
2223238 4/1990 United Kingdom .

Primary Examiner—Robert J. Warden
Assistant Examiner—Amalia Santiago

[57] ABSTRACT

Hydrocarbons are prepared from a feed gas of hydrogen and carbon monoxide by feeding the feed gas into a reaction zone at an elevated temperature and pressure and allowing the hydrogen and carbon monoxide to react in the presence of a catalyst retained in the reaction zone to yield hydrocarbons. A reservoir of a hydrogen-rich gas is maintained at a pressure above the pressure of the feed gas, the reservoir and the reaction zone being connected in such a way that a continuous flow of hydrogen-rich gas is maintained from the reservoir into the reaction zone. A reactor in use in the preparation is shutdown by interrupting the feeding of the feed gas, thereby allowing hydrogen-rich gas to flow from the reservoir at increased rate and quench the reactions occurring in the reaction zone.

3 Claims, 1 Drawing Sheet

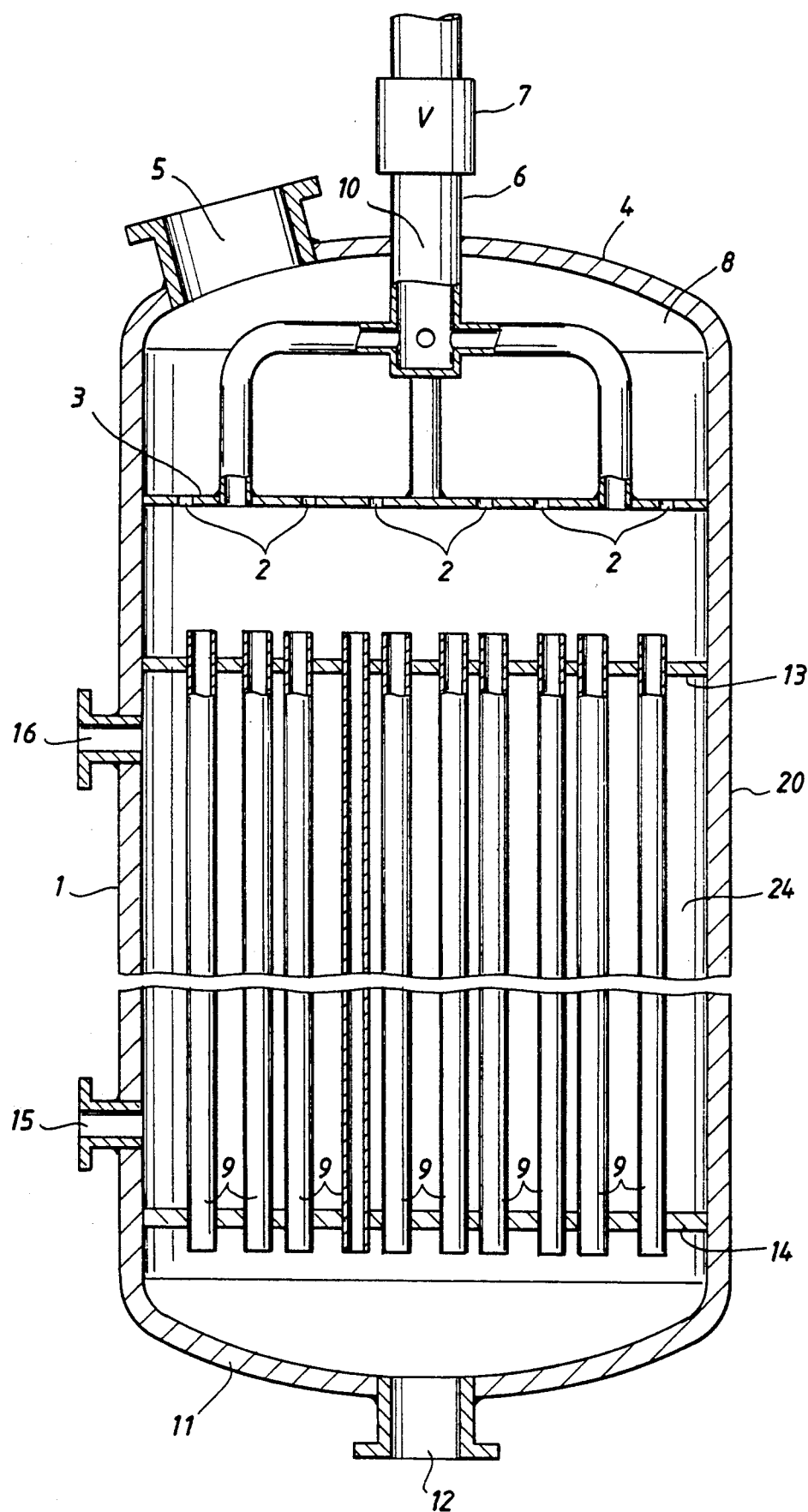

5,286,455

PROCESS FOR THE PREPARATION OF HYDROCARBONS

This is a continuation of application Ser. No. 710,991, filed Jun. 6, 1991 now abandoned.

FIELD OF THE INVENTION

The present invention relates to a process for the preparation of hydrocarbons, for example paraffinic, olefinic and/or aromatic hydrocarbons, by the reaction of a mixture of hydrogen and carbon monoxide at elevated temperature and pressure in the presence of a catalyst retained in a fixed catalyst bed. The invention further relates to the shutdown of the aforementioned process.

BACKGROUND OF THE INVENTION

Processes for the preparation of hydrocarbons, in particular an at least partly liquid hydrocarbonaceous product, by the catalytic reaction of carbon monoxide with hydrogen (a mixture often referred to as "synthesis gas") in a reaction zone containing the catalyst bed are well known. This reaction is highly exothermic and cooling means are used in a reactor for carrying out such process to remove heat from the reacton zone. Additionally, such a reactor is usually provided with means to recycle gas through the catalyst bed for equalizing the temperature of the catalyst bed, thus avoiding the formation of hydrocarbonaceous deposits on the catalyst.

When a reactor comprising a fixed bed of the aforementioned type is to be shutdown the supply of carbon monoxide and hydrogen is interrupted. In the reactor space above the catalyst bed, usually a dome-like space, a large amount of reactant gas mixture is present, which will pass through the catalyst bed at a relatively low velocity. At such low velocities, the reaction heat may be insufficiently removed and hot spots may be formed in the catalyst bed. These hot spots result in a deterioration of the performance of the catalyst.

The possibility for the formation of hot spots in the catalyst bed of fixed bed reactors in general and resultant damage to the catalyst is known in the art. Thus, in UK Patent Application No. 2,169,309 a process for the shutdown of a reactor in use in the conversion of oxygenates, such as alcohols, into gasoline is disclosed. In the process of this UK application, when the circulation of recycle gas to the reactor falters, automatic valves terminate the feed of oxygenates to the reactor and then inject inert gases into the reaction zone to quench the reactor.

According to UK Patent Application No. 2,223,237 the above-mentioned problem of overheating the catalyst may be overcome by carrying out the following steps:

(i) interrupting the feed of synthesis gas;
(ii) depressurizing the reactor downstream of the catalyst, and providing the reactor upstream of the catalyst with inert gas and/or hydrogen, preferably hydrogen; and
(iii) cooling the catalyst to ambient conditions.

In one embodiment the dome-like space above the catalyst bed is filled with packing bodies, the bodies containing hydrogen releasable therefrom when the pressure in the reactor falls below the working pressure. The inert bodies may comprises an interfacial membrane permeable to hydrogen and impermeable to carbon monoxide, or the inert bodies may comprise material which absorbs hydrogen under reaction conditions and desorbs under shutdown conditions.

Surprisingly, it has now been found that the decline in performance of a hydrocarbon synthesis catalyst in a fixed bed reactor, occurring as a result of the shutdown of the reactor during operation of the synthesis process, can be significantly reduced by maintaining a reservoir of hydrogen-rich gas at a pressure above the pressure of the feed gas and arranged such that hydrogen-rich gas can flow from the reservoir into the fixed bed during operation. By such a process, it is possible to protect the catalyst during shutdown by rapidly quenching the reaction with a hydrogen-rich atmosphere.

SUMMARY OF THE INVENTION

In a first aspect, the present invention provides a process for the preparation of hydrocarbons from a feed gas comprising hydrogen and carbon monoxide, which process comprises feeding said feed gas into a reaction zone at an elevated temperature and pressure and allowing the hydrogen and carbon monoxide to react in the presence of a catalyst retained in the reaction zone to yield hydrocarbons, in which process a reservoir of a hydrogen-rich gas is maintained at a pressure above the pressure of the feed gas, the reservoir and the reaction zone being connected in such a way that a continuous flow of hydrogen-rich gas is maintained from the reservoir into the reaction zone.

For a second aspect, the present invention provides a process for the shutdown of a reactor in use in a process as hereinbefore defined, in which process the feeding of the feed gas comprising hydrogen and carbon monoxide is interrupted, thereby allowing hydrogen-rich gas to flow from the reservoir at an increased rate and quench the reactions occurring in the reaction zone.

In a third aspect, the present invention provides apparatus for use in a process as hereinbefore defined, comprising a reactor having a reaction zone in which catalyst can be retained; an inlet for introducing at elevated pressure a feed gas from a feed gas supply into the reaction zone; means for interrupting the flow of feed gas to the reaction zone from the feed gas supply; storage means for maintaining a reservoir of hydrogen-rich gas at a pressure above that of the feed gas; connection means extending between the storage means and the reaction zone by which hydrogen-rich gas can flow from the reservoir into the reaction zone while the flow of feed gas is uninterrupted.

DETAILED DESCRIPTION OF THE INVENTION

During normal operation of the process, the pressure of the hydrogen-rich gas in the reservoir is maintained above that of the feed gas. Preferably, the pressure in the reservoir is in the range of from about 0.1 to 10 Pa, more preferably about 0.2 to 2 Pa, above the pressure of the feed gas. It will be self evident that the pressure of the hydrogen-rich gas should not be lower than that of the feed gas. In this way a continuous flow of hydrogen-rich gas from the reservoir into the reaction zone is maintained during normal operation of the process. However, the pressure of the reservoir should not be so high as to lead to an undesirable level of addition of hydrogen to the reaction zone.

The quantity of hydrogen-rich gas maintained in the reservoir will be relatively large, in comparison to the volume of the reaction zone, and should be sufficient to substantially quench the reactions occurring in the entire reaction zone. Further, the reservoir of hydrogen-rich gas should be arranged with respect to the reaction zone as to allow the hydrogen-rich gas to enter the reaction zone as rapidly as possible, once the feed of hydrogen and carbon monoxide has been interrupted. Under normal operating conditions, the hydrogen-rich gas preferably flows into the reaction zone at a rate of from about 0.001 to 1.0 m$^3$/s/m$^2$ on the basis of 1 m$^3$ of the reaction zone. In the case of a shutdown the flow rate of the hydrogen-rich gas is increased, suitably to a flow rate of about 0.2 to 4 m$^3$/s/m$^2$ on the basis of 1 m$^3$ of the reaction zone. Most preferably, the hydrogen-rich gas enters the reaction zone substantially instantaneously, once the feed of hydrogen and carbon monoxide has been interrupted.

The term "hydrogen-rich gas" as used herein is a reference to a gas comprising in the major part hydrogen, preferably at least about 70% by volume of hydrogen, more preferably at least about 90% by volume. Other inert gases may be present in the hydrogen-rich gas, for example nitrogen, argon or inert gaseous hydrocarbons, such as methane. Especially preferred is a hydrogen-rich gas containing more than about 97% by volume, most preferably substantially about 100% by volume of hydrogen.

In a preferred embodiment of the apparatus, the connection means comprises a plate-like body with holes, preferably a sieve plate or a perforated plate. In use, the hydrogen-rich gas passes from the reservoir through the holes and into the reaction zone.

Typically, the apparatus may comprise a substantially vertically arranged reactor comprising a feed section in the top portion, a reactant section or reaction zone in the middle portion for containing a catalyst and an effluent section in the bottom portion. Such reactors are well known in the art. Multitubular reactors may be employed comprising, for example, about 5000 to 30,000 tubes each having a diameter of about 20 to 50 mm. In such reactors, the tubes are usually packed with the catalyst particles, with the cooling medium being circulated around the tubes. Reactors and processes suitable for the application of the present invention are described in U.S. Pat. Nos. 4,683,121 and 4,751,057.

Thus, in one embodiment the apparatus of the present invention comprises a multitubular reactor comprising a normally substantially vertically extending vessel, a plurality of reactor tubes arranged in the vessel substantially parallel to the longitudinal axis, means for passing heat-exchange medium along the outer surfaces of the reactor tubes, a feed section arranged at the top and a discharge section at the bottom, wherein above and/or adjacent to the feed section a reservoir of hydrogen-rich gas is provided, the feed section and the reservoir being separated by a plate-like body with holes, preferably a sieve plate or perforated plate.

In an alternative embodiment, the reactor may comprise means for retaining a fixed bed of catalyst particles within the reactor and a cooling means comprising one or more cooling tubes formed into a helical pattern, each helical pattern comprising one or more helices. The use of such a reactor in the preparation of hydrocarbons is disclosed in UK Patent Application No. 2,204,055.

The storage means for maintaining the reservoir of hydrogen-rich gas preferably comprises the outer wall or shell of the reactor vessel itself. In a preferred arrangement, the reservoir is maintained in the dome-like end of a conventional reactor vessel, most conveniently the dome-like end adjacent the inlet or upstream end of the reaction zone. In such an arrangement, with the reservoir of hydrogen-rich gas connected to the reaction zone by means of a sieve plate or perforated plate, for example, a very rapid, virtually instantaneous supply of hydrogen-rich gas and hence quenching of the reactions can be realized upon shutdown.

The processes and apparatus of the present invention are particularly suitable for use in the synthesis of hydrocarbons from a mixture of carbon monoxide and hydrogen, in particular hydrocarbons having at least about 5 carbon atoms, more preferably about 10 carbon atoms, especially at least about 20 carbon atoms. The higher molecular weight hydrocarbons will be liquid under the conditions prevailing in the reactor. The hydrocarbons are most suitably substantially paraffinic. The process and apparatus are particularly suited to the preparation of heavy paraffins having from about 5 to 100 carbon atoms.

The feed gas for the process comprises a mixture of carbon monoxide and hydrogen. The feed may also comprise small quantities of carbon dioxide, water, nitrogen, argon and minor amounts of compounds having from 1 to about 4 carbon atoms, for example methane, methanol and ethane.

The gas may be prepared in any manner known in the art, for example by means of steam/oxygen gasification of hydrocarbonaceous material such as brown coal, anthracite, coke, crude mineral oil and fractions thereof, and oil recovered from tar sand and bituminous shale. Alternatively, steam methane reforming and/or catalytic partial oxidation of a hydrocarbonaceous material with an oxygen-containing gas may be used.

Catalysts for use in the present process are well known in the art and typically comprise as active components zeolites or one or more metals from group VIII of the Periodic Table, especially from the iron group, supported on a carrier, optionally in combination with one or more metal oxides and/or other metals as promotors. The metal oxide promoters are typically selected from the elements in groups IIa, IIIb, IVb, and/or Vb of the Periodic Table as well as from lanthanides and/or actinides. The metal promoter may be selected from the elements in groups VIIb and/or VIII of the Periodic Table.

The synthesis reactions occurring in the process of the present invention are conducted at an elevated temperature, for example in the range of from about 100° to 500° C., preferably from about 125° to 350° C., more preferably from about 175° to 250° C. The reactions are conducted at an elevated pressure, typically in the range of from about 1 to 200 bar, preferably from about 5 to 100 bar, more preferably about 12 to 50 bar. The reactor is typically operated under a space velocity of from about 200 to 20,000 m$^3$ gaseous feed/m$^3$ reaction zone/hour, at standard temperature and pressure (0° C. and 1 bar absolute).

The molar ratio of hydrogen to carbon monoxide in the feed gas is typically in the range of from about 0.4 to 4, more preferably from about 1.8 to 2.5. During normal operation of the synthesis process, the molar ratio of hydrogen to carbon monoxide is most preferably maintained in the range of from about 0.9 to 2. It is a further advantageous feature of the process of the present invention that the flow of hydrogen-rich gas from the reservoir into the reaction zone during normal operation may be used to adjust the molar ratio of hydrogen to carbon monoxide in the feed gas.

In the event of a shutdown of the synthesis reactor, the molar ratio of hydrogen to carbon monoxide is preferably increased to a value above about 2.1, if necessary. During the shutdown, the pressure in the reaction zone is preferably reduced, suitably by a factor of about 0.5 to 0.04, from the normal operating pressure (typically about 40 bar) to about 7 bar over a preferred period of time of from about 1 to 60 minutes, more preferably about 15 minutes. At the start of shutdown, the flow of feed gas to the reactor will be interrupted, thereby causing, without further action, a rapid quenching of the reaction zone by hydrogen-rich gas from the reservoir.

Typically, microprocessors with appropriate software will be used for controlling and adjusting the feed of hydrogen-rich gas to the reservoir during normal operation and in emergency situations.

BRIEF DESCRIPTION OF THE DRAWING

An embodiment of the present invention will now be further described, by way of example only, having reference to the accompanying FIGURE which is a diagrammatical cross-sectional representation of an apparatus according to the present invention.

Referring to the FIGURE, a vertical reactor vessel, generally indicated as 1, has an upper dome-like end housing 4, containing a central feed pipe 6 branching into a plurality of branches above a horizontal sieve plate or sieve tray 3 containing holes 2. The central feed pipe has an inlet 10 for connection to a supply of feed gas (not shown). The feed pipe 6 is further provided with a valve 7 as a means for interrupting the flow of feed gas. The upper end housing 4 and sieve tray 3 together define a hydrogen-rich gas reservoir 8. An inlet 5 is provided in the upper end housing 4 for connection to a supply of hydrogen-rich gas (not shown).

The reactor vessel further comprises a lower dome-like end housing 11 having an outlet 12. A generally cylindrical reactor mid section 20 extends between the lower portion of the upper end housing 4 and upper portion of the lower end housing 11. Horizontal tube sheets 13 and 14 are located within the reactor vessel at the junction of the mid section 20 and the upper and lower end housings 4 and 11 respectively. The tube sheets 13 and 14 together with the mid section 20 define a reaction zone 24. A plurality of tubes 9 containing catalyst particles extend between the tube sheets 13 and 14 within the reaction zone 24. The mid section 20 is provided with an inlet 15 and an outlet 16 to allow circulation of a cooling medium, typically water, around the tubes in the reaction zone 24.

During normal operation, a feed gas comprising hydrogen and carbon monoxide is introduced into the reactor via the inlet 10 in the upper end housing 4 to flow via the central feed pipe 6 to contact the catalyst retained in the tubes in the reaction zone 24. Effluent containing hydrocarbons from the reaction zone leaves the reactor via the outlet 12 in the lower end housing 11. A flow of hydrogen-rich gas is fed via the inlet 5 in the upper end housing 4 to maintain a hydrogen-rich atmosphere in the reservoir 8 at a pressure above the inlet pressure of the feed gas. Hydrogen-rich gas leaves the reservoir 8 through the holes 2 in the sieve tray 3 and combines with the feed gas entering the reaction zone 24.

In the case of a shutdown of the reactor, for example in an emergency situation (trip), the flow of feed gas to the inlet 10 is interrupted, e.g. by closing valve 7, and the pressure within the reactor is reduced. The flow rate of hydrogen-rich gas from the reservoir 8 in the upper end housing 4 through the sieve tray 3 will suitably increase by a factor of from about 5 to 100, typically about 30. During shutdown the flow rate of hydrogen-rich gas into the reservoir 8 through the inlet 5 in the upper end housing 4 is increased.

The sieve tray 3 is preferably arranged to lie from about 0.1 to 1 m, more preferably from about 0.2 to 0.6 m, above the reaction zone, i.e. above the upper tube sheet 13. By reducing the volume between the sieve tray 3 and the upper tube sheet 13, the time required for quenching of the reaction zone may be reduced. However, for effective transport of feed gas into the tubes, the sieve tray 3 is preferably at least about 0.1 m, more preferably at least about 0.2 m, above the upper tube sheet 13.

The size and number of holes 2 in the sieve tray 3 are selected to ensure that a sufficient pressure drop exists across the tray to maintain a hydrogen-rich atmosphere in the reservoir and prevent feed gas from escaping from beneath the sieve tray 3. In operation, the flow of hydrogen-rich gas through the sieve tray 3 prevents loss of the feed gas.

Typical data for the operation of a reactor of the type shown in the Figure under normal process conditions and upon shutdown and using substantially pure hydrogen as a hydrogen-rich gas are given in Tables 1 and 2.

TABLE 1

| Dimensions of a Reactor Top According to the Invention | | |
|---|---|---|
| Radius of dome | about | 1–4 m |
| Dome volume | about | 2–130 m$^3$ |

TABLE 2

| Summary of the Flow of Hydrogen Through Sieve Tray in the Top of the Reactor | | | |
|---|---|---|---|
| Condion | Pressure (Bar) | Flow Rate m$^3$/s/m$^2$ | Pressure Drop Pa |
| Normal | 40.8 | 0.001–0.1 | 1–100 |
| Shutdown (trip) | 40.0 | 0.2–4 | 500–5000 |

It can readily be seen that, upon shutdown, the hydrogen present in the reservoir within the upper end housing of the reactor very rapidly flows into the reaction zone of the reactor and quenches the reactions occurring therein.

What is claimed is:

1. Apparatus for use in a process for the preparation of hydrocarbons from a feed gas comprising hydrogen and carbon monoxide, which apparatus comprises a reactor vessel having a sieve tray disposed across said reactor vessel; a catalyst-containing reaction zone disposed below said sieve tray and defined between two horizontal tube sheets wherein said reaction zone comprises a plurality of catalyst-containing reactor tubes arranged in the reactor vessel substantially parallel to a longitudinal axis of said reactor vessel and wherein said reactor tubes extend between the horizontal tube sheets; a storage cavity disposed above said sieve tray and defined by an upper end of said reactor vessel and said sieve tray; a hydrogen-rich gas inlet disposed in the upper end of said reactor vessel and terminating above the sieve tray and in said storage cavity; a feed gas inlet terminating below the sieve tray and above said reaction zone; means for interrupting the flow of feed gas to the reaction zone from the feed gas inlet; wherein said storage cavity is in communication with said reaction zone through said sieve tray; and an outlet disposed in a lower end of said reactor vessel.

2. The apparatus according to claim 1 in which the sieve tray is at least about 0.1 m above an upper of said two horizontal tube sheets.

3. Apparatus according to claim 2 in which the sieve tray is at least from about 0.2 m to about 0.6 m above an upper of said two horizontal tube sheets.

* * * * *